Feb. 1, 1955
S. A. MUIRHEAD
2,700,916
DEVICE FOR RESTRICTING LIGHT ACCEPTANCE
ANGLES FOR LIGHT METERS
Filed June 6, 1951
2 Sheets-Sheet 2
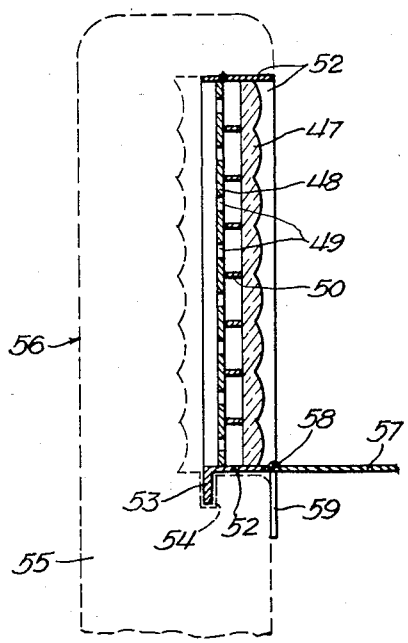
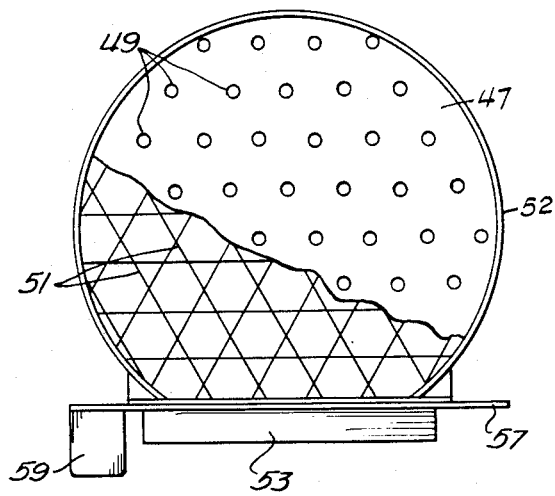
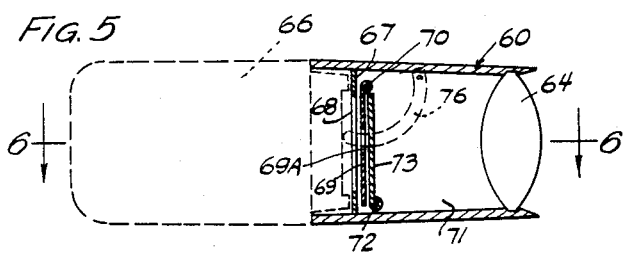
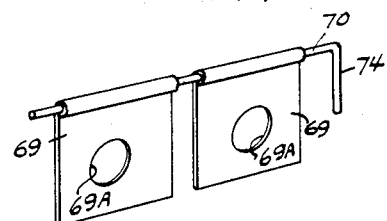
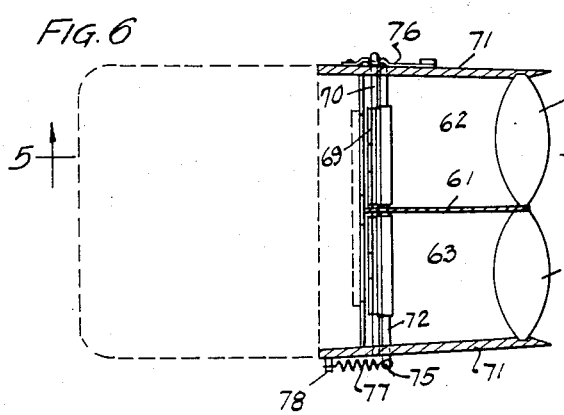
INVENTOR.
SAMUEL A. MUIRHEAD
BY
James A. Livnau
ATTY

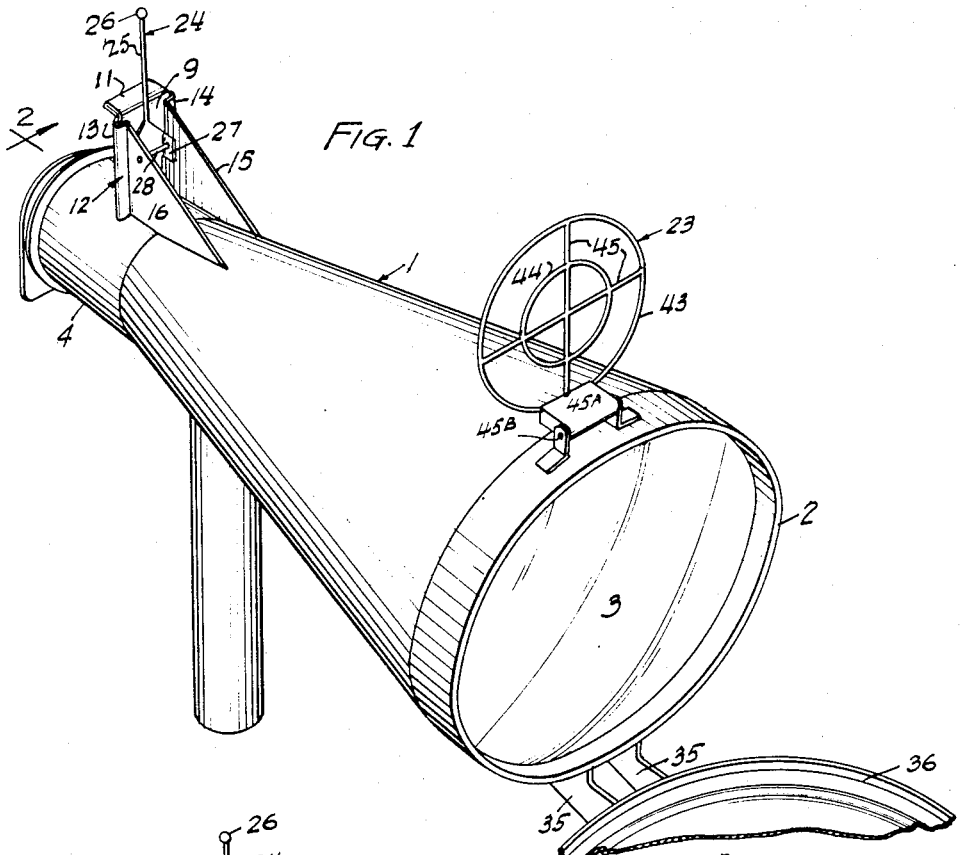
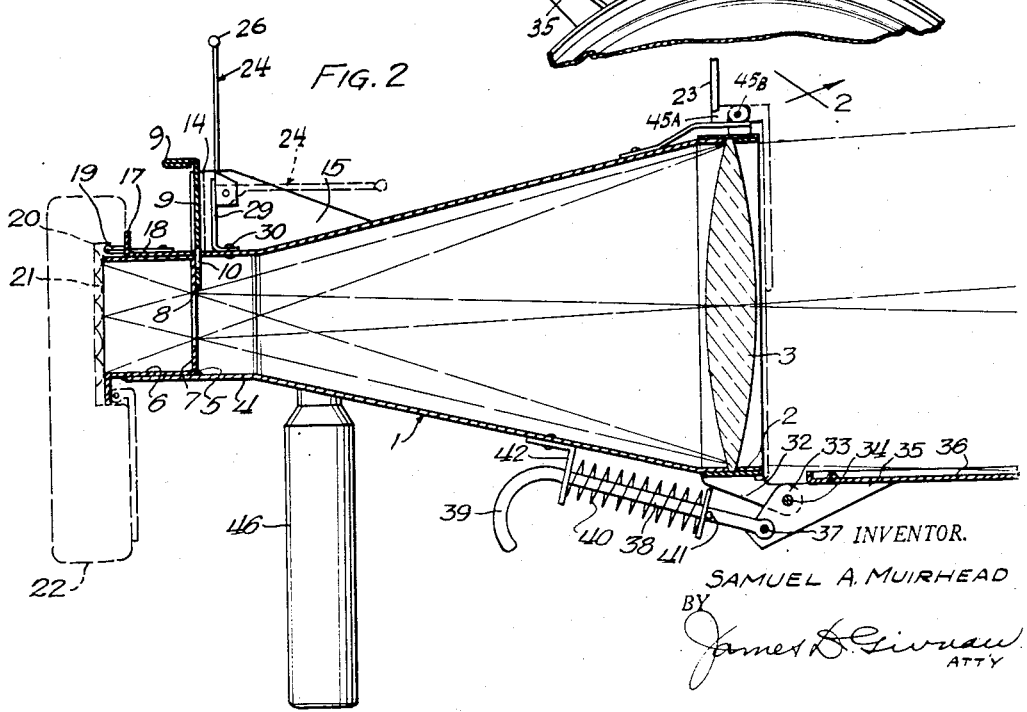

United States Patent Office 2,700,916
Patented Feb. 1, 1955

2,700,916

DEVICE FOR RESTRICTING LIGHT ACCEPTANCE ANGLES FOR LIGHT METERS

Samuel A. Muirhead, The Dalles, Oreg.

Application June 6, 1951, Serial No. 230,175

4 Claims. (Cl. 88—23)

This invention is directed to a device adapted for quick and convenient attachment to a photo-electric exposure meter or as an integral part or feature thereof to restrict the angle of light acceptance by the meter by means of a lens or lenses to collect light and one or more apertures at the focal point to restrict the angle of light acceptance of the device.

A further object of the invention is the provision of a device of this character incorporating means to insure uniform acceptance over most of the area scanned and relatively sharp cut-off at the limits of acceptance in contrast to photo-electric baffle tubes used heretofore.

A further object is the provision of a lens cover to protect the lens of the invention from physical damage and as a protection against accidental exposure of the meter to the harmful effects of direct sunlight.

A still further object is the provision of a device of this character which permits of a narrow angle of acceptance of a light meter to a considerable degree without the awkward scale multiplying factors that would be required if auxiliary baffle tubes were used; sensitivity to low light values; uniform scanning of entire area with no partially scanned fringe and easy interpretation of scale readings.

These and other objects will appear as my invention is more fully hereinafter described in the following specification, illustrated in the accompanying drawings and finally pointed out in the appended claims.

In the drawings:

Figure 1 is a perspective view of the invention with the lens cover shown in an open position.

Figure 2 is a longitudinal sectional side elevation taken approximately along the line 2—2 of Figure 1.

Figure 3 is a fragmentary, sectional side elevation of a modified form of the invention.

Figure 4 is a front elevation of Figure 3 with a fragment broken away for convenience of illustration.

Figure 4 is a sectional side view of a further modified form of the invention. This view is taken along the line 5—5 of Figure 6.

Figure 6 is a sectional top plan view taken approximately along the line 6—6 of Figure 5.

Figure 7 is a perspective detail view of a pair of apertured diaphragms and actuating lever therefor.

Figure 8 is a perspective view of a pair of cover plates for protecting the sensitive light meter against exposure to direct sunlight.

In one form of embodiment, as illustrated in Figures 1 and 2, the invention comprises a conically-shaped housing 1 whose enlarged end terminates in a ring 2 for securing a lens 3 to the enlarged end of the housing.

The opposite end of the housing terminates in a cylindrical portion 4 of reduced diameter and within which is secured by welding or the like as at 5 a cylindrical member 6 having an inner end wall or diaphragm 7 which is formed with a central opening 8 which is located at the focal plane of the lens 3. Extending into and slidably mounted for vertical movement with respect to the cylindrical portion 4 is a plate 9 formed with an opening 10 adapted to be moved into and out of alignment with the opening 8 formed in the wall 7 of the cylindrical member 6. The upper end of the plate 9 is turned at right angles to itself as at 11 to provide a convenient finger grip for the operator. The plate 9 is vertically slidable within a vertical frame 12 having two opposed channels 13 and 14 formed therein. The frame 12 is secured to or formed integral with the rearward end of a pair of parallel supporting plates 15 and 16 secured by any suitable means, such as welding or the like to the cylindrical portion 4 and the conical portion of the housing 1. The outer end of the cylindrical portion 4 is formed or provided with a partial angular flange 17 through which extends a spring latch 18 whose one end is secured by any suitable means to the periphery of the cylindrical portion 4 and whose opposite or free end terminates in a hook portion 19 adapted for engagement with the usual ring 20 by means of which a lens 21 is secured within various types of conventional light meters generally indicated at 22.

Mounted upon the housing is a front sight 23 and cooperating rear sight 24 for convenience in aiming the invention at objects to be dealt with. The rear sight comprises a shaft 25 formed or provided with a bead 26 at its outer end and whose opposite end is pivotally attached by means of flanges 27 and a pin 28 to the parallel plates 15 and 16. By this arrangement, the shaft 25 of the rear sight may be moved from an inoperative, horizontal position to a vertical position as shown in full lines. The shaft is held in either of said positions through the medium of the edges of the flanges 27 bearing against a vertical leaf spring 29 secured as at 30 at its lower end to the cylindrical portion 4 of the housing 1.

The opposite or flared open end of the housing 1 contains the lens 3 as aforesaid secured within the ring 2 by any approved means. The bottom edge of the ring 2 is provided with a pair of brackets 32 through whose outer ends extends a pin 34 to which is pivotally attached a bracket 35. The outer end of the bracket is secured by welding or the like to a closure 36. The opposite end of the bracket is pivotally attached as at 37 to an arm 38 formed at its outermost end into a finger pull 39. The arm 38 is surrounded by a compression spring 40 whose one end bears against a pin 41 carried by the arm and whose opposite end bears against an abutment 42 secured to and depending from the housing 1. By this arrangement, the closure 36 will be normally urged into a vertical position to cover the lens 3.

The front sight 23, cooperating with the rear sight as aforesaid, comprises an outer ring 43 and a concentric inner ring 44 secured together by cross-wires 45 whose intersection is adapted for alignment with the bead 26 of the shaft 25 when in a vertical position while at the same time an imaginary line through the intersection of said cross-wires and said bead will be parallel to the longitudinal axis of the conical housing 1 on a line extending through said lens 3 and the cylindrical projection 4. The front sight is mounted upon a base 45A which is pivotally attached as at 45B to the ring 2 of the housing 1 so that the sight may be swung forwardly and downwardly into an out-of-the-way position when not in use.

For convenience in holding and manipulating the invention, I provide the conical housing with a handle 46.

In operating this form of the invention, the operator holds the conical housing 1 in a position whereby he may align the bead 26 of the rear sight 24 aand the intersection of the cross-wires 45 of the front sight 23 and the object to be photographed to determine the amount of reflected light or amount of light emanating from the object, then when the object is properly sighted in, the amount of light will be registered on the light meter 22 so that the operator may set his camera accordingly.

In the modified form of the invention illustrated in Figures 3 and 4, I dispense with the conical housing 1 shown in the other form of the invention and instead combine a lens 47 with a disk 48 formed with a plurality of apertures 49. The lens 47 and disk 48 are united in proper, spaced-apart, parallel relation to each other by means of a separator 50 made up of a plurality of cells 51. The lens, separator and disk are mounted within a cylindrical collar 52 whose inner bottom portion is formed with a downwardly extending flange 53 adapted to be inserted in a slot 54 formed in the body 55 of a light meter generally indicated at 56. The outer rim of the collar 52 is provided with a closure disk 57 hinged as at 58 to the collar and provided with an actuator in the form of a depending plate 59 by means of which the closure may be swung from a vertical position wherein it covers the lens 47 to a horizontal position as shown wherein it fully uncovers and exposes the lens 47.

In the further modified form of the invention illustrated in Figures 5 and 6, I provide a housing 60 provided with a central partition wall 61 to provide two light passageways 62 and 63 each provided with a lens 64 and 65, respectively, at its forward end. The inner end of the housing is adapted for frictional or latched engagement with one type of conventional light meter 66. Spaced inwardly from the inner end of the housing is a fixed diaphragm 67 formed with openings 68 of square formation aligned with said lenses. Adjacent the diaphragm 67 is a pair of movable diaphragms 69 secured to a shaft 70 which is rotatably mounted in the side walls 71 of the housing 60. These diaphragms are formed with central openings 69A. Also hingedly attached to the side walls of the housing by means of a shaft 72 is a pair of closure plates 73 adapted to be swung into a vertical position, as shown, to close the openings 69A and 68 to protect the light meter against damage by accidental exposure to direct sunlight. The end portions of both shafts 70 and 72 are turned at right angles to themselves as indicated at 74 and 75, respectively, to provide convenient finger grips for rotating the shafts. For holding the diaphragms 69 in an open or closed position, I secure a corrugated leaf spring 76 of arcuate formation to one side wall 71 of the housing to frictionally engage the downwardly turned portion 74 of the shaft 70 within its corrugations. To maintain the closure plates 73 in a vertical position as shown to cover the openings 69A and 68, I provide a tension spring 77 whose one end is connected to the end of the upwardly turned portion 75 of the shaft 72 and whose opposite end is connected by means of a pin 78 to one side wall of the housing 60. When operating this form of the invention, the operator swings the cover plates 73 downwardly into an open position by means of the upwardly turned portion 75 of the shaft against the influence of the spring 77.

While I have shown particular forms of embodiment of my invention, I am aware that many minor changes therein will readily suggest themselves to others skilled in the art without departing from the spirit and scope of the invention.

Having thus described my invention, what I claim as new and desire to protect by Letters Patent is:

1. A device for restricting light acceptance angles for light meters, comprising in combination a hollow housing closed at one of its ends by a lens and open and adapted at its opposite end for attachment to a light meter, a front sight attached to the housing at its closed end, a rear sight attached near said open end of the housing, a fixed diaphragm secured within said housing near its said open end formed with an opening therethrough, a movable diaphragm having an opening therein and slidably mounted on said housing for movement to the interior thereof for aligning both of said openings and for selectively closing said first mentioned opening, a closure hingedly attached to said closed end of the housing and adapted to be moved into an open or closed position.

2. A device as in claim 1 wherein said sights are hingedly attached to said housing whereby said rear sight may be moved from a vertical position to a horizontal position and whereby said front sight is movable from a vertical position forwardly and downwardly into a position parallel to said closed end of said housing.

3. A device for restricting light acceptance angles for light meters, comprising in combination a conically shaped housing closed by a lens at its enlarged end and open at its reduced end, means provided at said reduced open end for attachment to a light meter, a fixed diaphragm secured within the housing near its reduced end and having an opening therein, a movable diaphragm slidably mounted upon the housing for movement to the interior thereof and having an opening therein adapted for alignment with the opening in said fixed diaphragm, a spring-urged closure hingedly attached to the enlarged end of said housing and adapted to be moved into an open or closed position, front and rear sights pivotally attached to said housing and adapted to be moved into an open or closed position.

4. A device for restricting light acceptance angles for light meters, comprising in combination a hollow housing closed at one of its ends by a lens and open and adapted at its opposite end for attachment to a light meter, a front sight attached to the housing at its closed end, a rear sight attached near said open end of the housing, a fixed diaphragm secured within said housing near its said open end formed with an opening therethrough at the focal point of said lens, a movable diaphragm having an opening therein and slidably mounted on said housing for movement to the interior thereof for aligning both of said openings and for selectively closing said first mentioned opening, a closure hingedly attached to said closed end of the housing and adapted to be moved into an open or closed position.

References Cited in the file of this patent

UNITED STATES PATENTS

| Number | Name | Date |
|---|---|---|
| 1,546,264 | Story | July 14, 1925 |
| 1,970,579 | Schweitzer | Aug. 21, 1934 |
| 1,990,361 | Bailey | Feb. 5, 1935 |
| 2,016,469 | Weston | Oct. 8, 1935 |
| 2,175,027 | McCune | Oct. 3, 1939 |
| 2,184,017 | Mihalyi | Dec. 19, 1939 |
| 2,203,761 | Williams | June 11, 1940 |
| 2,209,156 | Fischer | July 23, 1940 |
| 2,242,043 | Sanger et al. | May 13, 1941 |
| 2,248,758 | Higonnet et al. | July 8, 1941 |
| 2,269,813 | Garity et al. | Jan. 13, 1942 |
| 2,293,576 | Townsley | Aug. 18, 1942 |
| 2,296,103 | Haberkost | Sept. 15, 1942 |
| 2,528,716 | Williams et al. | Nov. 7, 1950 |
| 2,556,431 | Mihalyi | June 12, 1951 |

FOREIGN PATENTS

| 152,369 | Austria | Jan. 25, 1938 |